United States Patent
Kemeny

[11] Patent Number: 6,035,981
[45] Date of Patent: Mar. 14, 2000

[54] CONSERVATIVE BROADBAND PASSIVE MASS DAMPER

[75] Inventor: Zoltan A. Kemeny, Tempe, Ark.

[73] Assignee: Vistek, Inc., Temple, Ariz.

[21] Appl. No.: 09/082,616

[22] Filed: May 20, 1998

Related U.S. Application Data

[60] Provisional application No. 60/047,201, May 20, 1997, and provisional application No. 60/050,516, Jun. 23, 1997.

[51] Int. Cl.[7] .................................................. F16F 7/10
[52] U.S. Cl. .............................. 188/379; 188/136; 188/73
[58] Field of Search .............................. 267/136, 73, 74; 248/562, 636; 188/379

[56] References Cited

U.S. PATENT DOCUMENTS

| | | | |
|---|---|---|---|
| 2,222,146 | 11/1940 | Jonsson | 267/73 X |
| 5,178,357 | 1/1993 | Platus | 248/619 |
| 5,307,753 | 5/1994 | Besonen, Sr. et al. | 267/73 X |
| 5,540,417 | 7/1996 | Spencer | 267/74 X |
| 5,549,270 | 8/1996 | Platus et al. | 248/619 |
| 5,599,106 | 2/1997 | Kemeny | 384/36 |

FOREIGN PATENT DOCUMENTS

| | | | |
|---|---|---|---|
| 258805 | 11/1987 | Japan | 267/136 |
| 962692 | 10/1982 | U.S.S.R. | 267/136 |
| 1068635 | 1/1984 | U.S.S.R. | 267/136 |

*Primary Examiner*—Matthew C. Graham
*Assistant Examiner*—Mariano Sy
*Attorney, Agent, or Firm*—Snell & Wilmer L.L.P.

[57] ABSTRACT

The present invention relates to a passive mass damper for broadband suppression of vibrations. The mass damper preferably includes a bob supported by nonlinear springs with high secant stiffness and low tangent stiffness. The mass damper is mounted on a machine or other source of vibration. The vibration generated by the machine is transmitted to the mass damper and induces off phase vibration of the bob which suppresses the inducing vibration.

14 Claims, 9 Drawing Sheets

CONSERVATIVE BROADBAND PASSIVE MASS DAMPER

This application claims the benefit of U.S. Provisional Application Ser. No. 60/047,201, filed May 20, 1997, and U.S. Provisional Application Ser. No. 60/050516, filed Jun. 23, 1997.

TECHNICAL FIELD

The present invention generally relates to a device for controlling vibration. More particularly, the present invention relates to a passive mass damper for conservative broadband suppression of vibrations.

BACKGROUND

In general, vibration originating from machines or other sources is most often undesirable and detrimental. For example, vibration in a precision machining tool may lead to faults and imperfections in work pieces produced on the tool. The vibration also may be transmitted through the floor and disrupt other tools. Additionally, the noise generally associated with machine vibration may be disruptive to workers.

Various methods and devices exist to reduce undesirable vibrations and may be generally categorized as vibration isolators or suppressors. Typically, vibration isolation devices operate locally to reduce transmissibility, wherein transmissibility is typically defined as the ratio of the transmitted force to the disturbing force. As such, vibration isolation devices are particularly suitable for reducing discrete and transient vibrations. For example, various reflexive and absorptive material, such as rubber, cork, foam and the like, may be placed in connective elements of a stamping machine, such as the stamping table and legs, to isolate the discrete vibrations associated with the stamping action of the machine.

In contrast, vibration suppression devices typically operate globally to suppress vibration. As such, vibration suppression devices are particularly suitable for reducing cyclic vibrations or vibrations which may be difficult to isolate to a particular element of a machine. For example, the motor of a machine generates cyclic vibrations. Rather than attempting to isolate the vibration transmitted through various connective elements of the machine, the entire machine may be mounted on a vibration suppression base. While the vibration suppression base may reduce the global vibration generated by the machine, local transmission of vibration may not be altered. In fact, certain vibration suppression devices may actually amplify local transmission of vibration.

Vibration mitigation devices may be categorized further as active or passive devices. Typically, active devices incorporate a feedback system which detects the amplitude and/or frequency of the disrupting vibration and responds accordingly to reduce or eliminate the vibration. TD Therefore, active devices are capable of broadband reduction of vibration. However, the complexity and cost of typical active devices often make them impractical for many applications.

In contrast, passive devices are typically mechanical devices which generally use various spring elements and damping elements to reduce or eliminate vibrations. However, conventional passive devices generally operate to reduce vibrations only in a fairly narrow bandwidth. Additionally, certain materials used in conventional passive devices, such as rubber and lubricating fluid, may be inappropriate for use in certain environments, such as clean room environments.

A spring damper device is one conventional passive vibration suppression device which is described in various mechanical textbooks and handbooks. In a spring damper device, a spring element and a damper element reduce vibration by removing the energy of a vibrating system through the damper element. However, the spring damper device typically operates at a narrow bandwidth determined by the stiffness of the spring element and the damper coefficient of the damper element. Typically, vibrations outside of this narrow preset bandwidth will not be effectively reduced. In fact, vibrations at certain frequencies will often produce increased responses with a peak response occurring when the frequency of the vibration is equal to the natural frequency of the spring damper system. Consequently, a spring damper device must often be precisely calibrated to match the frequency of the vibrating system.

In another conventional device, a spring element is used in combination with a beam-column element to reduce the transmission of vibration. See U.S. Pat. No. 5,178,357, issued on January 1993, to Platus and related U.S. Pat. No. 5,549,270, issued on August 1996, to Platus et al. More particularly, a spring and a beam-column are calibrated such that one element has a positive stiffness and the other element has an equal negative stiffness. In this manner, an object is supported with net-zero effective stiffness. However, a spring and beam-column pair is required for each axis to be isolated from vibration and each spring and beam-column pair must be precisely calibrated to achieve a net-zero effective stiffness in each axis. As such, this method is fairly complicated and difficult to calibrate and adjust. Additionally, as the requisite negative and positive stiffness are achieve through two separate elements, if one element wears at a rate different than that of the other, their stiffness will no longer match and a net-zero effective stiffness will not be achieved.

SUMMARY OF THE INVENTION

The present invention relates to a device for broadband suppression of vibrations. According to a preferred embodiment of the present invention, a mass damper device includes a mass element and a plurality of nonlinear spring elements with high secant stiffness and low tangent stiffness. The mass damper is mounted on a vibration source which induces vibration of the mass element on the spring elements. The mass element vibrates off phase from the inducing vibration to suppress the inducing vibration.

BRIEF DESCRIPTION OF THE DRAWING FIGURES

The present invention will hereinafter be described in conjunction with the appended drawing figures, wherein like numerals generally denote like elements, and:

DETAILED DESCRIPTION OF THE INVENTION

The present invention is preferably configured to reduce vibrations in systems such as machines, plants, tools, platforms, and the like which have multi-rotary or reciprocating parts and impact sources, particularly those with parts and sources which cannot be effectively isolated, which have less vibration modes than vibration sources, which require global rather than local transmission reduction, or in which the open loop vibration is substantially dominated by resonance.

For example, a mass damper in accordance with a preferred embodiment of the present invention is configured to operate with a Chemical Mechanical Planarization ("CMP") tool used in the semiconductor industry to planarize and polish wafers to an extremely planar and smooth surface. As background, wafers in a CMP tool are typically held by carrier heads then lowered and pressed against a polishing pad, while a slurry is often added to aid in the CMP process. Additionally, the polishing pad and carrier heads are typically rotated at differential speeds while the carrier heads are typically oscillated back and forth. The multiple directional movement, the unmatched motor speeds and hydrodynamic fluctuation of the entrapped slurry typically creates a combination of high and low frequency vibrations which may result in wafer loss. Also, the resulting vibrations are commonly transmitted through the floor to other vibration sensitive machines and tools while the resulting noise may be detrimental to nearby workers. Although the present invention may be used in a CMP environment, the present invention also is configured to reduce vibration in various environments and systems.

Figure 1:
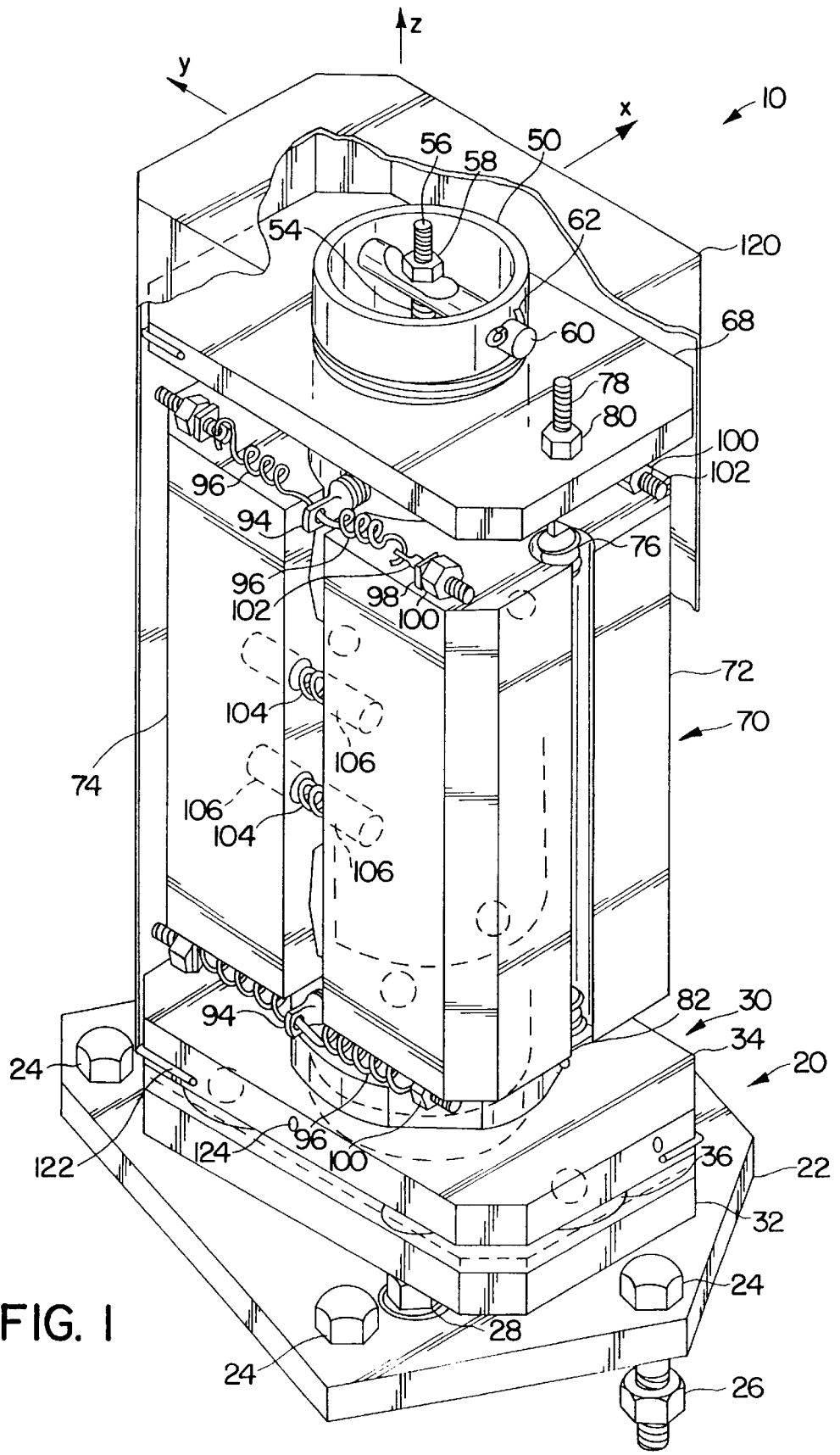
FIG. 1 is perspective view of a mass damper in accordance with the present invention.

With respect to the details of the device, FIG. 1 shows a mass damper in accordance with one embodiment of the present invention. Mass damper 10 has 6 degrees-of-freedom ("DOF"); 3 translational modes along x, y, and z axes, and 3 rotational modes about x, y and z axes. In a preferred embodiment, mass damper 10 preferably includes a plurality of ball-in-recess assemblies as nonlinear spring elements in combination with mass elements to substantially achieve broadband suppression of vibrations.

Base assembly 20 is preferably rigidly connected to a source of vibration, such as a machine tool. Base 20 preferably includes base plate 22 and a plurality of anchor bolts 24 and nuts 26. Base plate 22 is preferably rigidly attached to the source of vibration by anchor bolts 24 and nuts 26 such that vibration is suitably transmitted to base plate 22 without substantial distortion. Base plate 22 is preferably formed from metal, ceramic, or other suitable rigid material.

Figure 2:
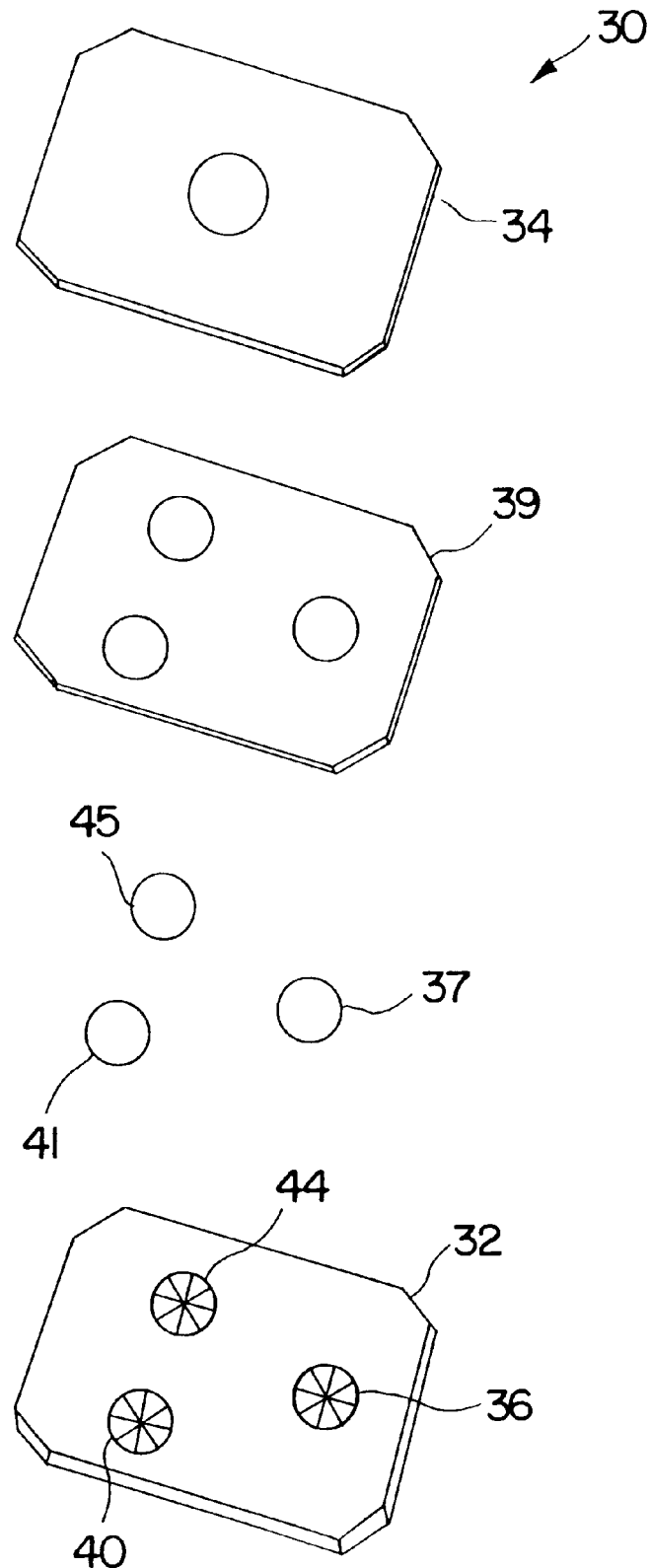
FIG. 2 is an exploded perspective view of a portion of the device shown in FIG. 1.

Assembly 30 is preferably rigidly mounted on base plate 22. Leveler studs 28 are preferably configured to level assembly 30 thereby defining the x-y plane of mass damper 10. Assembly 30 preferably includes a plurality of ball-in-recess assemblies disposed between bottom plate 32 and top plate 34. More particularly, with additional reference to FIG. 2, cone-shaped recesses 38, 40 and 44 are suitably formed by known methods in bottom plate 32. Substantially matching cone-shaped recesses 36, 42 and 46 are suitably formed by known methods in top plate 34 (recesses in top plate 34 are not shown). Balls 37, 41 and 45 are preferably disposed between recesses 36, 38, 40, 42, 44 and 46, respectively. Balls 37, 41 and 45 preferably lie within holes formed in spacer 39 disposed between bottom plate 32 and top plate 34 to substantially ensure constant relative distance between balls 37, 41, and 45. Spacer 39 is preferably formed from TEFLON® or other suitable low friction material to facilitate movement of bottom plate 32 relative to top plate 34.

Figure 3:
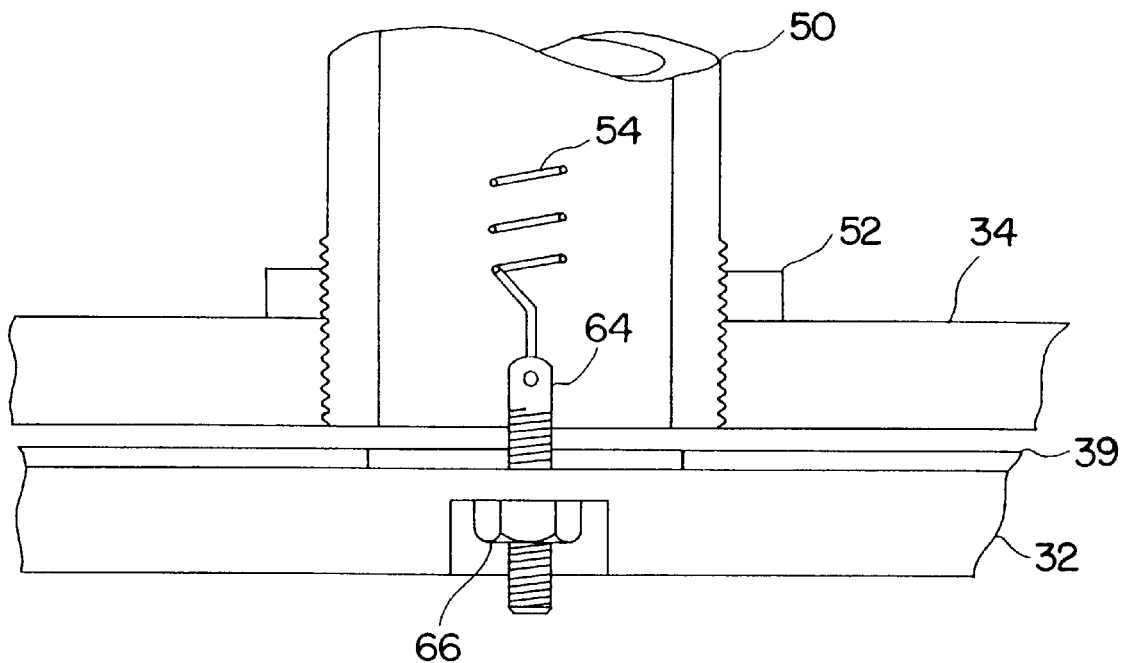
FIG. 3 is a cross-sectional view of another portion of the device shown in FIG. 1.

With additional reference to FIG. 3, tower 50 is preferably threaded into top plate 34 and counter locked by nut 52. Various methods are known in the art for securing tower 50 to top plate 34. For example, tower 50 can be welded to top plate 34.

Coil spring 54 is preferably disposed within the vertical centerline of tower 50 to define the z axis of mass damper 10. One end of coil spring 54 is preferably attached to bottom plate 32 and the other end is preferably attached to the top of tower 50. More particularly, coil spring 54 is preferably attached to bottom plate 32 using spring anchor 64 and nut 66. Coil spring 54 is preferably attached to dowel pin 60 by spring anchor 56 and nut 58. Dowel pin 60 is preferably attached to the top of tower 50 by cotter pin 62. The tension in coil spring 54 may be adjusted by adjusting either nut 52 or nut 66. Coil spring 54 may be attached to bottom plate 32 and top of tower 50 using various methods known in the art.

Coil spring 54 exerts a compressive force on bottom plate 32 and top plate 34 through tower 50 to suitably pre-compress the ball-in-cone assemblies in assembly 30. However, various methods are known in the art for suitably pre-compressing ball-in-cone assemblies.

Figure 4:
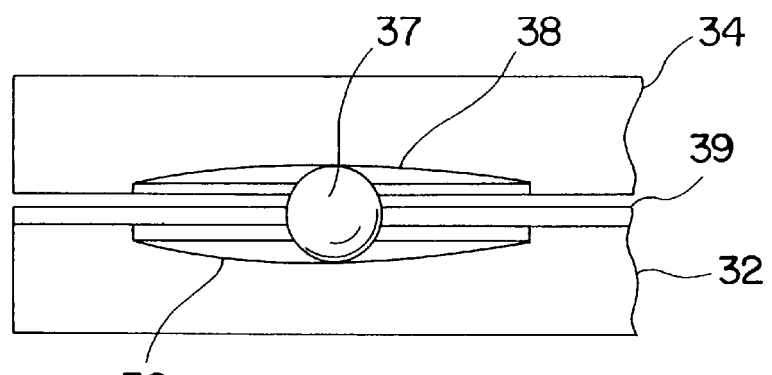
FIG. 4 is a cross-sectional view of a ball-in-recess assembly used in the device shown in FIG. 1.

With reference to FIG. 4, when mass-damper 10 is undisturbed by external vibrations or forces, ball 37 rests at the vertices of cone-shaped recesses 36 and 38 (for clarity only one ball-in-recess assembly is described). Similarly, balls 41 and 45 rest at the vertices of recesses 40, 42, 44 and 46, respectively. Therefore, the weight of top plate 34 and assemblies attached to top plate 34 and the compressive force of coil spring 54 are substantially distributed between balls 37, 41 and 45. Accordingly, balls 37, 41 and 45 are preferably formed from metal or other high strength material. Although three ball-in-recess assemblies have been described, one skilled in the art will appreciate that any number of ball-in-recess assemblies may be used without deviating from the spirit and scope of the present invention.

Referring again to FIG. 1, assembly 70 preferably includes a first bob 72 and a second bob 74 suspended over assembly 30 on cover plate 68. Cover plate 68 is preferably threaded on tower 50 and counter locked from underneath with a nut (not shown). Various methods are known in the art for securing cover plate 68 to tower 50. For example, cover plate 68 can be welded to tower 50.

Coil spring 76 is preferably disposed along a channel formed along the vertical center line of first bob 72. The top end of coil spring 76 is preferably attached to spring anchor 78 which is preferably placed through a hole formed in cover plate 68 and secured by nut 80. The bottom end of coil spring 76 is preferably attached to the bottom of first bob 72 by a spring anchor (not shown) and nut 52. Second bob 74 is preferably secured to cover plate 68 in a substantially similar manner. Alternatively, bobs 72 and 74 may be secured to cover plate 68 using various methods known in the art.

Figure 5:
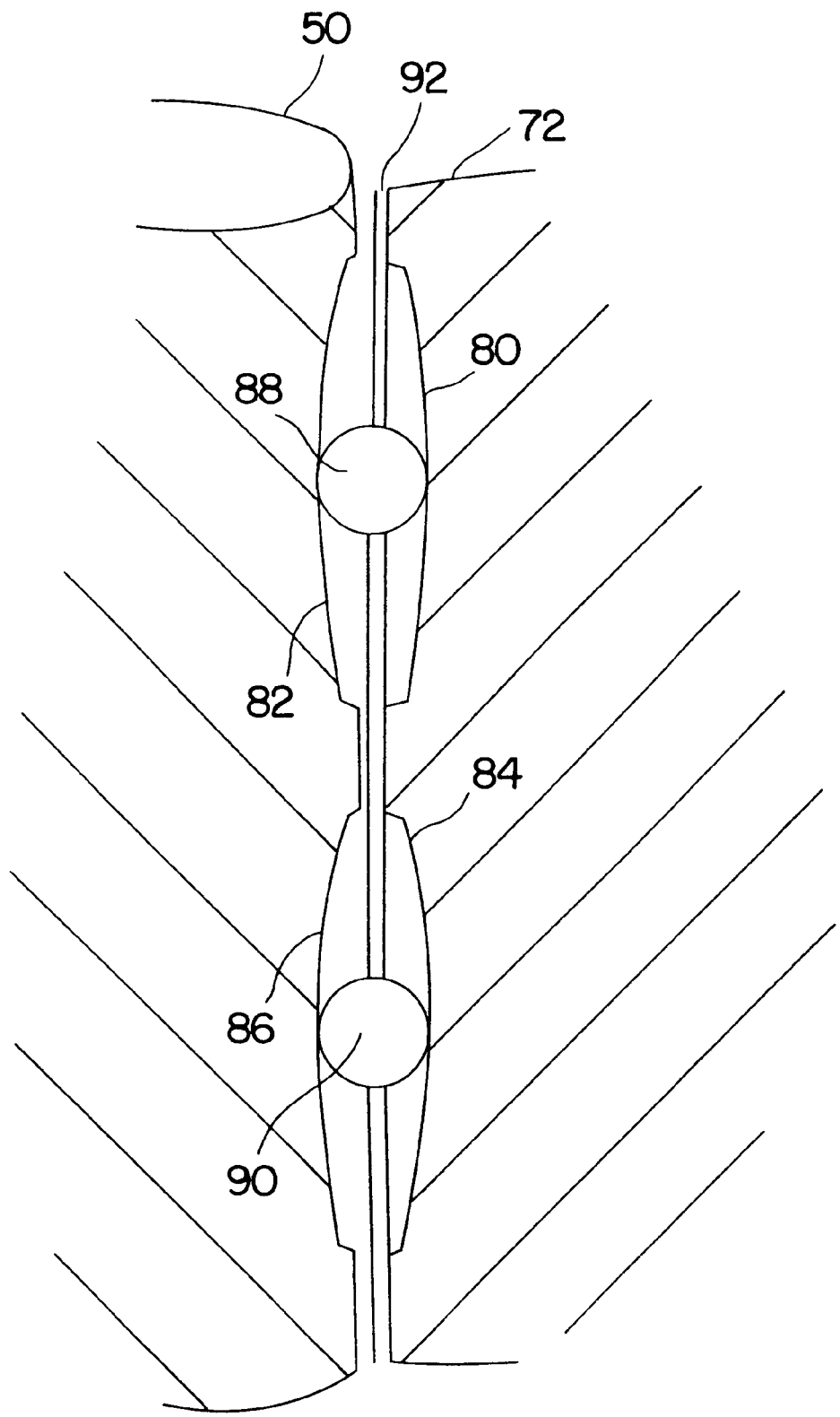
FIG. 5 is a cross-sectional view of another ball-in-recess assembly used in the device shown in FIG. 1.
Figure 6:
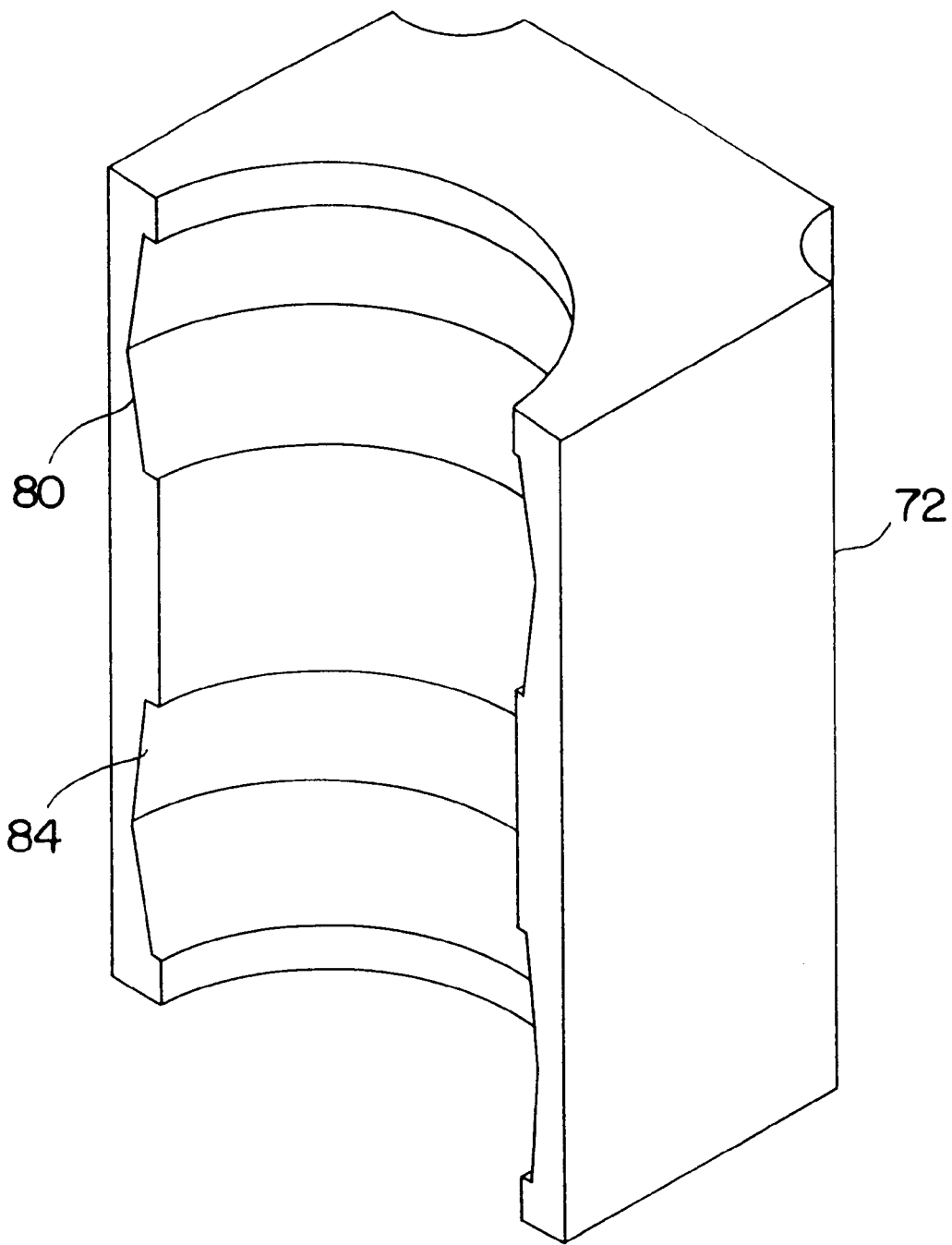
FIG. 6 is a perspective view of a bob used in the device shown in FIG. 1.

With reference to FIGS. 5 and 6, a plurality of ball-in-recess assemblies are preferably disposed between tower 50 and bobs 72 and 74. More particularly, cone-shaped raceways 82 and 86 are suitably formed around the circumference of tower 50. Substantially matching cone-shaped raceways 80 and 84 are suitably formed around the inner surface of bob 72. Balls 88 and 90 are preferably disposed between raceways 80, 82, 84 and 86, respectively. Additionally, balls 88 and 90 lie within holes formed in curved spacer 92 to ensure constant relative distance between balls 88 and 90. Spacer 92 is preferably formed from TEFLON® or other suitable low friction material to facilitate movement of bob 72 relative to tower 50. In a similar manner, Bob 74 is suitably configured with cone-shaped raceways, balls, and curved spacer to facilitate movement of bob 74 relative to tower 50.

Figure 7:
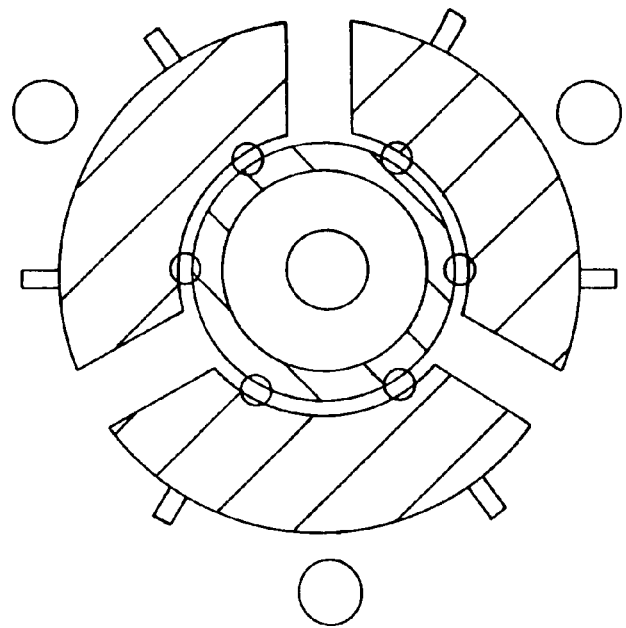
FIG. 7 is a top view of another mass damper in accordance with the present invention.

Although bob 72 and 74 have been described as two mass elements, any number of mass elements may be used in accordance with the present invention. For example, with reference to FIG. 7, a mass damper is shown with three mass elements.

Figure 8:
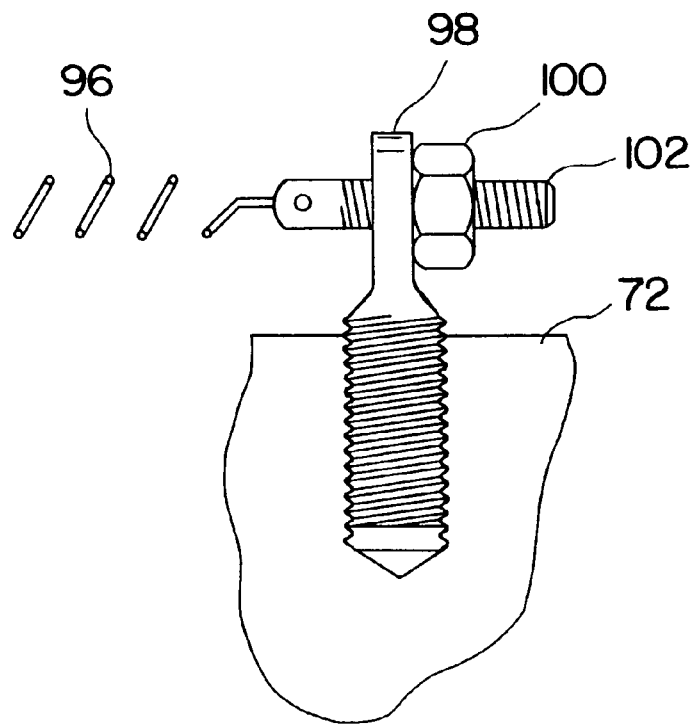
FIG. 8 is a side view of a portion of the device shown in FIG. 1.

With reference to FIG. 1, a plurality of spring anchors 94 are preferably rigidly attached to tower 50 and a plurality of anchors 98 are preferably rigidly attached to bobs 72 and 74. A plurality of springs 96 are preferably held in tension between spring anchors 94 on tower 50 and anchors 98 on bobs 72 and 74. More particularly, with additional reference to FIG. 8, one of the plurality of springs 96 is preferably suitably attached to one of the plurality spring anchors 94 and to one of the plurality of spring anchors 98 by anchor 102 and nut 100. A plurality of springs 104 held in compression between bores 106 formed in bobs 72 and 74 offset, in part, the force exerted by springs 96. Bobs 72 and 74 may be suitably pressed against tower 50 using various methods known in the art.

Housing 120 substantially encloses assemblies 30 and 70 to protect these assemblies from corrosion or undesired access. Seal 122 substantially hermetically seals housing 120, except for a hole in bottom plate 32 for coil spring 54 to pass. A plurality of bolts through tapped holes 124 suitably attach housing 120 to assembly 30.

Figure 9:
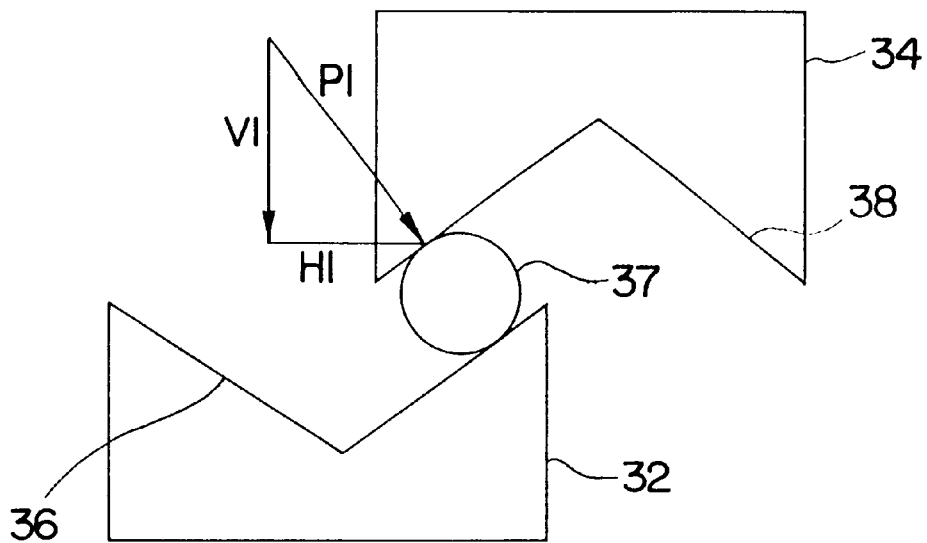
FIG. 9 is a cross-sectional view of a ball-in-recess assembly used in the device shown in FIG. 1.

With additional reference to FIG. 9, vibration in the x-y plane suitably translates bottom plate 32 relative to top plate 34. In response, ball 37 moves from the vertices of recesses 36 and 38 and onto the sloped perimeters of recesses 36 and 38 (for clarity, only one ball-in-recess assembly is described).

When ball 37 moves from the vertices of recesses 36 and 38, a portion of the weight of top plate 34 and the assemblies attached to top plate 34 and the compression force of coil spring 54 is exerted as force P1 normal to the sloped perimeters of recesses 36 and 38. Force P1 may be resolved into a vertical component V1 and horizontal component H1. The horizontal component H1 acts as a restorative force to translate top plate 34 and the assemblies attached to top plate 34 off phase relative to bottom plate 32.

Moreover, as the slope of recesses 36 and 38 is substantially constant, the restorative force, horizontal component H1, is substantially constant for varying displacements of bottom plate 32. As such, ball 37 and cone-shaped recesses 36 and 38 operate essentially as a nonlinear spring element with low tangential stiffness and high secant stiffness. Therefore, assembly 30 substantially provides broadband suppression of vibration in the x-y plane in the displacement range of the vibration source. Additionally, assembly 30 suitably provides soft support for small displacements in the x-y plane and stiff support for large displacements in the x-y plane.

The stiffness required to substantially achieve a broadband suppression of vibration in the x-y axis is a function of the mass of top plate 34 and the assemblies attached to top plate 34, the mass of the vibration source, and the stiffness coefficient of the source. More particularly, the requisite stiffness is approximately the stiffness coefficient of the source times the ratio of the mass of top plate 34 and the assemblies attached to top plate 34 to the mass of the source. The mass of top plate 34 and the assemblies attached to top plate 34 largely consists of the mass of bobs 72 and 74. The mass and stiffness coefficient of the vibration source may be measured using methods well known in the art. Alternatively, in the case of machine tools, the mass and stiffness coefficient may be provided by the manufacturers.

The effective stiffness provided by the ball-in-recess assemblies in assembly 30 is substantially a function of the forces applied to the balls, the diameter of the balls, and the geometry of the recesses. More particularly, the effective stiffness of a ball-in-recess assembly is approximately equal to the magnitude of the force applied to the ball divided by twice the difference between the radius of the rolling surfaces abutting the ball and the diameter of the ball.

The effective stiffness of the ball-in-recess assemblies in assembly 30 is sufficiently tuned such that the broadband response of assembly 30 is substantially centered on the frequency of the vibration. The stiffness of the ball-in-recess assemblies may be suitably tuned by appropriately altering the weight of top plate 34 and the assemblies attached to top plate 34. Alternatively, the stiffness of the ball-in-recess assemblies may be suitably tuned more easily by appropriately altering the tension in coil spring 54 by adjusting nut 58 or nut 66 thus facilitating easy field tuning of the broadband response of assembly 30.

Figure 10:
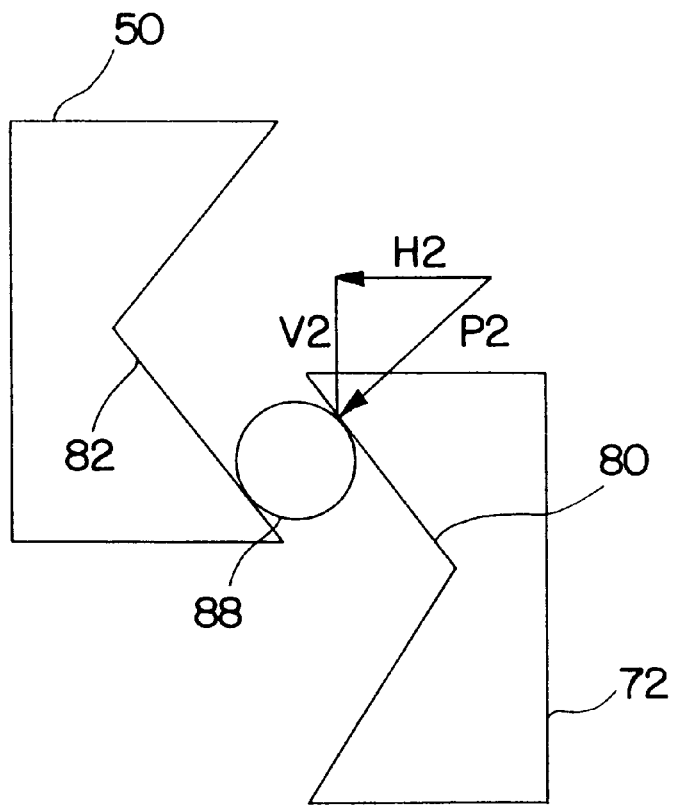
FIG. 10 is another cross-sectional view of a ball-in-recess assembly used in the device shown in FIG. 1.

With reference to FIG. 10, vibration in the x-z or y-z plane translates tower 50 vertically relative to bob 72. Ball 88 moves from the vertex of cone-shaped raceways 80 and 82 and onto the sloped perimeter of raceways 80 and 82 (for clarity only one ball-in-recess assembly is described).

Springs 96 and 104 combine to exert a force P2 normal to the sloped perimeters of raceways 80 and 82. Force P2 may be resolved into a horizontal component H2 and vertical component V2. Vertical component V2 operates to translate bob 72 off phase from tower 50.

As the slopes of the perimeters of raceways 80 and 82 are substantially constant, vertical component V2 is substantially constant for varying displacements. As such, ball 88 and raceways 80 and 82 operate essentially as a nonlinear spring element with low tangential stiffness and high secant stiffness. Therefore, assembly 70 substantially provides broadband suppression of vibration in the x-z and y-z planes for the displacement range of the vibration source. The broadband response of assembly 70 is suitably tuned to center the frequency of the vibration in a manner substantially similar to assembly 30. Additionally, assembly 70 suitably provides soft support for small displacement in these planes and stiff support for large displacements in the x-z and y-z planes.

If vibration is substantially restricted to the x-z or y-z planes then bob 74 responds substantially synchronously with bob 72. Bob 72 may suitably translate off-phase from bob 74 to oppose rotational vibration which may tend to rock tower 50. Additionally, bobs 72 and 74 may suitably translate horizontally to oppose rotational vibration which may tend to roll tower 50.

Multi-modal translational vibrations will result in multi-modal response by mass damper 10. For example, vibration in the x-y plane combined with vibration in the x-z plane will be suitably opposed by multi-modal off phase vibration of mass damper 10 induced by the translational motion of bottom plate 32 relative to top plate 34 and translation motion of tower 50 relative to bobs 72 and 74.

The requisite mass of bobs 72 and 74 largely is largely dependent on the specific application. The combined mass of bobs 72 and 74, however, should be within a range of about 0.5 to 25 percent of the mass of the vibration source. A mass of less than about 0.5 percent of the mass of the source provides insufficient energy to effectively suppress the vibration. A mass of greater than about 25 percent, however, results in overshooting.

Friction associated with the various ball-in-recess assemblies does not contribute significantly to the response characteristic of mass damper 10. Accordingly, mass damper 10 is a substantially conservative device.

Figure 13:
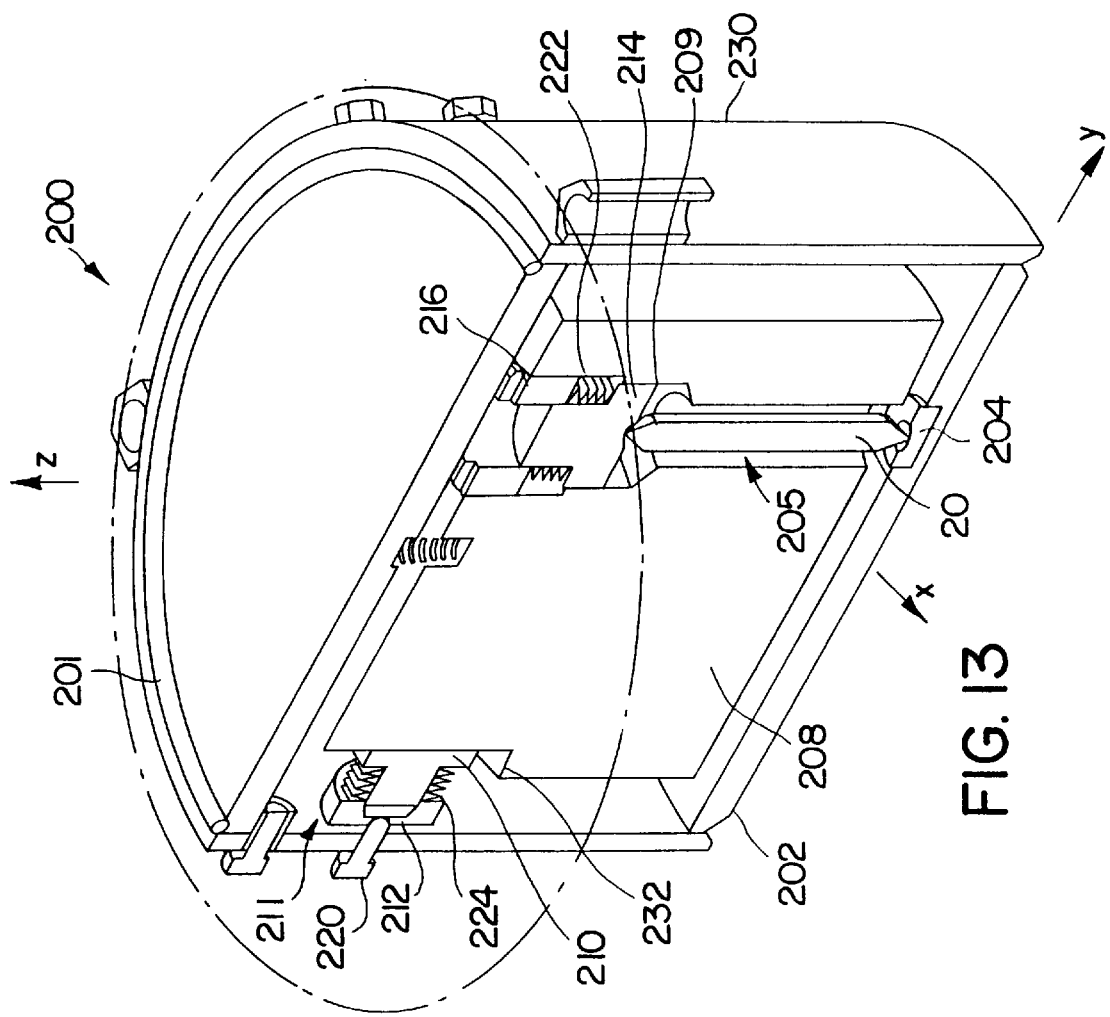
FIG. 13 is a perspective cross-sectional view taken through line 1—1 of the device shown in FIG. 11.
Figure 11:
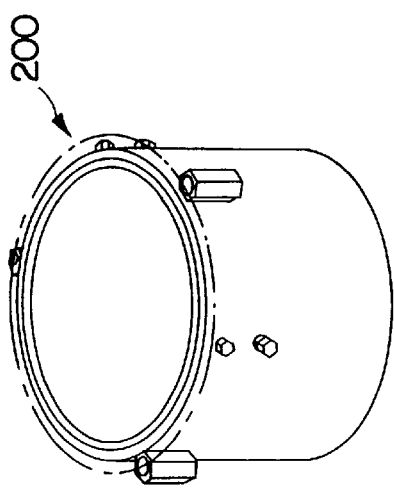
FIG. 11 is a perspective view of another mass damper in accordance with the present invention.
Figure 12:
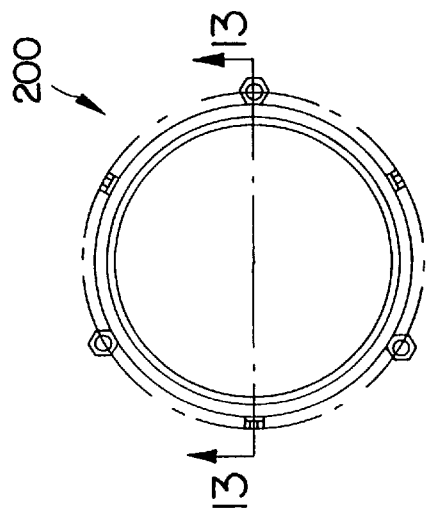
FIG. 12 is a top view of the device shown in FIG. 11.

With reference to FIGS. 11, 12 and 13, a mass damper in accordance with another embodiment of the present invention is shown. Mass damper 200 also has 6 degrees-of-freedom ("DOF"); 3 translational modes along x, y, and z axes, and 3 rotational modes about x, y and z axes. Mass damper 200, however, suitably incorporates known Bellevilles as nonlinear spring elements in combination with a mass element to substantially achieve broadband vibration suppression.

Mass damper 200 is preferably mounted on a vibration source, such as a machine tool, with cover 201 in contact with the source. Vibration is transmitted through housing 230 and base plate 202 to bob 208 suitably disposed within housing 230. Various Belleville assemblies suitably vibrate bob 208 off phase from the vibration source to substantially suppress the vibration.

More particularly, bob 208 is preferably suspended on base plate 202 by a plurality of Belleville assemblies. In a preferred embodiment, three Belleville assemblies are preferably disposed at 120 degree increments around the bottom of bob 208 (for clarity only Belleville assembly 205 is described).

Belleville assembly 205 preferably includes seat 204, needle support 206, piston 214, plurality of springs 222 and plug 216. Seat 204 is preferably disposed within a recess formed in base plate 202. The bottom end of needle support 206 suitably pivots on seat 204. Similarly, piston 214 suitably pivots on the top end of needle support 206. As bob 208 moves, piston 214 suitably slides within chamber 209 formed in bob 208. Plug 216, however, moves with bob 208. Plurality of springs 222 are appropriately disposed between piston 214 and plug 216 such that relative motion between piston 214 and plug 216 suitably compresses and elongates springs 222.

Additionally, bob 208 is suitably supported against housing 230 by a plurality of Belleville assemblies. In a preferred embodiment, three Belleville assemblies are preferably disposed at 120 degree increments around bob 208 (for clarity only Belleville assembly 211 is described).

Belleville assembly 211 preferably includes bolt 220, plunger 212, plurality of springs 224 and plug 210. Bolt 220 is preferably threaded through housing 230. Plunger 212 suitably pivots on bolt 220. Plug 210 rests against recess 232 formed in bob 208. Plurality of springs 224 are appropriately disposed between plunger 212 and plug 210 such that relative motion between plunger 212 and plug 210 suitably compresses and elongates springs 224.

In a preferred embodiment, springs 222 and 224 are preferably Bellevilles appropriately configured to exhibit low tangential stiffness and high secant stiffness. Bellevilles are well known in the art and may be manufactured to provide the requisite stiffness characteristics. Alternatively, standard Bellevilles may be suitably configured in parallel and/or series to provide the requisite stiffness characteristics. However, various nonlinear spring elements may be used in mass damper 200 to provide broadband suppression of vibrations. For example, suitable EPDM rubber may be used to suitably provide the requisite stiffness characteristics.

The requisite mass of bob 208 and requisite stiffness of springs 222 and 224 are determined in substantially the same manner as in the prior embodiment. However, both parameters largely are dependent on the specific application.

Figure 15:
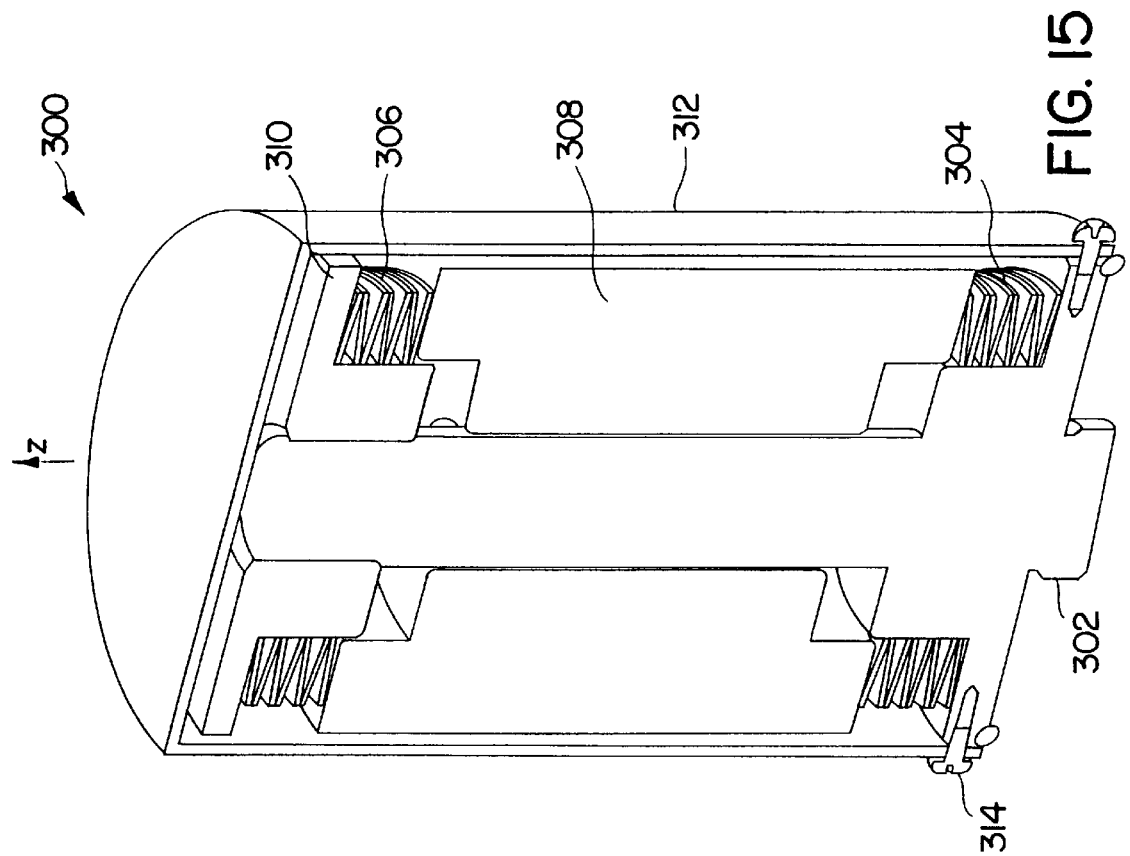
FIG. 15 is a perspective cross-sectional view taken through line 15—15 of the device shown in FIG. 14.
Figure 14:
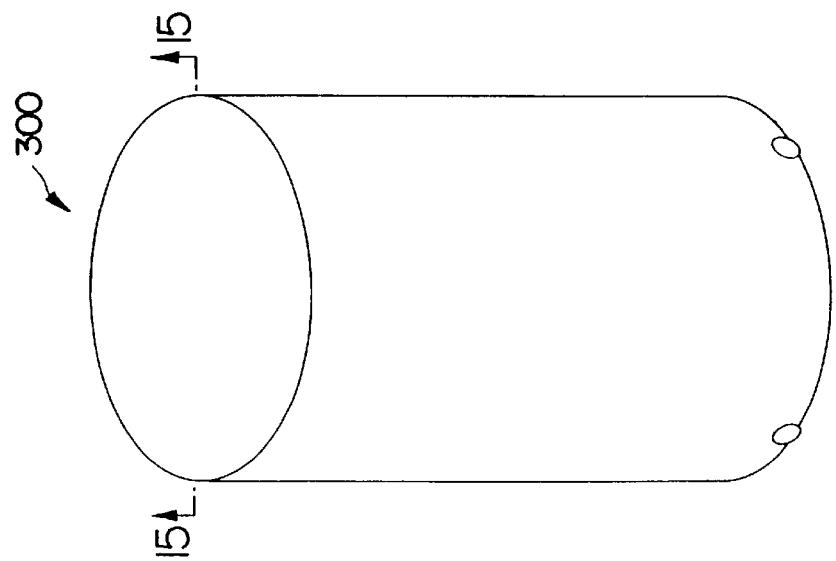
FIG. 14 is a perspective view of yet another mass damper in accordance with the present invention.

With reference to FIGS. 14 and 15, a mass damper in accordance with yet another embodiment of the present invention is shown. Mass damper 300 has one degree-of-freedom ("DOF") along the z axis. Mass damper 300 also uses Bellevilles as nonlinear spring elements in combination with a mass element to substantially achieve broadband suppression of vibration.

Mass damper 300 preferably includes base 302, plurality of springs 304 and 306, bob 308 and plug 310. Housing 312 is preferably attached to base 302 by bolt 314. Bob 308 is preferably suspended on springs 304 and 306 between base 302 and plug 310. Vibration from a source is transmitted through housing 312 to base 302. Springs 304 and 306 suitably vibrate bob 308 off phase from the vibration source to substantially suppress the vibration.

In a preferred embodiment, springs 304 and 306 are preferably Bellevilles with low tangential stiffness and high secant stiffness. However, as with the prior embodiment, various springs elements may be used with mass damper 300 to substantially achieve broadband suppression of vibration.

In a most preferred embodiment, a plurality of mass dampers 300 are preferably used to reduce planetary wobbling related to rotation of a heavy, large diameter, thick grinding head. Mass of bob 308 is about 2 to 8 percent of the grinding head. Ten mass dampers 300 are preferably disposed at about 36 degree increments around the grinding head. When the grinding head rotates at about 30 to 40 RPM, the wobbling vibration of the grinding head is substantially suppressed.

Although specific embodiments and parameters have been described, various modification may be apparent to one of ordinary skill in the art upon reading this disclosure. Therefore, it is to be understood that the embodiments described in this disclosure are merely illustrative of and not restrictive on the broad invention and that this invention is not limited to the specific embodiments shown and described herein.

What is claimed is:

1. A conservative passive mass damper, for broadband vibration suppression of vibrations from a vibration source, said mass damper comprising:

a base connected to the vibration source;

a tuned mass for stabilizing the vibration source, wherein said tuned mass has substantially less mass than the vibration source; and said spring assembly configured between said base and said tuned mass, wherein said spring assembly further comprises nonlinear springs with a high secant stiffness and a low tangent stiffness in a displacement range of said tuned mass, said spring assembly further comprising:

a bottom plate connected to said base;

a top plate connected to said bottom plate, wherein said bottom plate and top plate are configured with a plurality of matching recesses;

a plurality of balls disposed between said matching recesses in said bottom plate and said top plate;

a tower assembly connected to said top plate, wherein said tuned mass is attached to said tower assembly.

2. A mass damper in accordance with claim 1, wherein said tuned mass has a mass within a range of 0.5 to 25 percent of the mass of the vibration source.

3. A mass damper in accordance with claim 1, wherein said high secant stiffness and said low tangent stiffness of said nonlinear springs are adjusted to center on the frequency of the vibration of the object.

4. A mass damper in accordance with claim 1, further comprising an extension spring for applying a compressive force to said plurality of balls, said extension spring being connected at a first end to said tower assembly and connected at a second end to said bottom plate, wherein said extension spring is adjustable to adjust said compressive force applied to said plurality of balls.

5. A mass damper in accordance with claim 1, further comprising:

matching raceways formed in said tower assembly and said tuned mass, wherein said matching raceways are conically shaped; and a plurality of balls disposed between said matching raceways.

6. A mass damper in accordance with claim 5, wherein said tuned mass further comprises a plurality of bobs, wherein said plurality of bobs are suspended with a plurality of extension springs attached to said tower assembly.

7. A mass damper in accordance with claim 1, further comprising a housing assembly for containing said tuned mass and said spring assembly, said housing assembly having a bottom end formed by said base and a top end.

8. A mass damper in accordance with claim 7, wherein said tuned mass has a plurality of vertical recesses and said spring assembly further comprises a plurality of vertical Belleville assemblies, wherein each of said plurality of vertical Belleville assemblies comprises:

a seat formed in said base;

a needle support having a top end, and a bottom end pivotally supported on said seat;

a piston pivotally supported on said top end of said needle support;

a plug connected to one of said plurality of recesses; and a plurality of Belleville springs disposed between said piston and said plug for facilitating relative motion between said piston and said plug.

9. A mass damper in accordance with claim 7, wherein said tuned mass has a plurality of horizontal recesses and said spring assembly further comprises a plurality of horizontal Belleville assemblies, wherein each of said plurality of horizontal Belleville assemblies comprises:

a bolt threaded through said housing;

a plunger pivotally supported on said bolt;

a plug connected to one of said plurality of horizontal recesses; and a plurality of Belleville springs disposed between said piston and said plug for facilitating relative motion between said piston and said plug.

10. A conservative passive mass damper for broadband vibration suppression of vibrations from a vibration source, said mass damper comprising:

a housing assembly connected to said vibration source;

a tuned mass having a mass substantially less than the vibration source, said tuned mass being contained within said housing assembly; and a vibrating means configured to vibrate said tuned mass out of phase with respect to vibrations from the vibration source, wherein said vibrating means is characterized by a high secant stiffness and a low tangent stiffness and comprises a plurality of Belleville spring assemblies, wherein each of said plurality of Belleville spring assemblies comprises:

a piston pivotally supported against said housing assembly;

a plug connected to said tuned mass, and a plurality of Belleville springs disposed between said piston and said plug for facilitating relative motion between said piston and said plug.

11. A mass damper in accordance with claim 10, wherein said tuned mass has cylindrical sides, wherein at least three of said plurality of Belleville spring assemblies are disposed in a vertical orientation around a bottom end of said tuned mass.

12. A mass damper in accordance with claim 11, wherein at least three of said plurality of Belleville spring assemblies are disposed in a horizontal orientation around said cylindrical sides of said tuned mass.

13. A mass damper in accordance with claim 10, wherein said vibrating means comprises a ball-in-recess assembly.

14. A mass damper in accordance with claim 13, wherein said housing assembly comprises a base plate, and said ball-in-recess assembly further comprises:

a bottom plate connected to said base plate;

a top plate connected to said bottom plate, wherein said bottom plate and said top plate are configured with a plurality of matching recesses;

a plurality of balls disposed between said matching recesses in said bottom plate and said top plate;

a tower assembly connected to said top plate, wherein said tuned mass is attached to said tower assembly;

a coil spring for applying a compressive force to said plurality of balls, said extension spring being connected at a first end to said tower assembly and connected at a second end to said bottom plate;

a plurality of raceways formed in said tower assembly and said tuned mass, wherein said matching raceways are conic shaped; and a plurality of balls disposed between said matching raceways.

* * * * *